US012619795B2

(12) United States Patent
Anderson et al.

(10) Patent No.: US 12,619,795 B2
(45) Date of Patent: May 5, 2026

(54) ARTIFICIAL INTELLIGENCE-BASED TECHNIQUES FOR DESIGN GENERATION IN VIRTUAL ENVIRONMENTS

(71) Applicant: AUTODESK, INC., San Francisco, CA (US)

(72) Inventors: Fraser Anderson, Camrose (CA); Josh Davis, Mill Valley, CA (US); George Fitzmaurice, Toronto (CA); Tovi Grossman, Toronto (CA); Merten Stroetzel, San Rafael, CA (US)

(73) Assignee: AUTODESK, INC., San Francisco, CA (US)

( * ) Notice: Subject to any disclaimer, the term of this patent is extended or adjusted under 35 U.S.C. 154(b) by 852 days.

(21) Appl. No.: 17/410,941

(22) Filed: Aug. 24, 2021

(65) Prior Publication Data

US 2022/0067228 A1 Mar. 3, 2022

Related U.S. Application Data

(60) Provisional application No. 63/073,883, filed on Sep. 2, 2020.

(51) Int. Cl.
| | |
|---|---|
| *G06F 30/27* | (2020.01) |
| *G06F 30/10* | (2020.01) |
| *G06F 30/12* | (2020.01) |
| *G06F 30/23* | (2020.01) |

(Continued)

(52) U.S. Cl.
CPC .............. *G06F 30/12* (2020.01); *G06F 30/10* (2020.01); *G06F 30/23* (2020.01); *G06F 30/27* (2020.01); *G06N 3/0475* (2023.01); *G06F 2111/18* (2020.01)

(58) Field of Classification Search
CPC .......... G06F 30/10; G06F 30/13; G06F 30/27; G06N 3/0475; G06N 3/094
See application file for complete search history.

(56) References Cited

U.S. PATENT DOCUMENTS

| | | | |
|---|---|---|---|
| 2004/0049472 A1* | 3/2004 | Hayashi ................. | G06N 3/126 |
| | | | 706/13 |
| 2019/0392728 A1 | 12/2019 | Pike et al. | |
| 2020/0210814 A1* | 7/2020 | Mehr ........................ | G06N 5/04 |

FOREIGN PATENT DOCUMENTS

| | | |
|---|---|---|
| CN | 107533373 A | 1/2018 |
| CN | 110517355 A | 11/2019 |
| CN | 111557005 A | 8/2020 |

OTHER PUBLICATIONS

Bashabsheh, Ahmad K., Hussain H. Alzoubi, and Mostafa Z. Ali. "The application of virtual reality technology in architectural pedagogy for building constructions." Alexandria Engineering Journal 58.2 (2019): 713-723. (Year: 2019).*

(Continued)

*Primary Examiner* — David A Hopkins
(74) *Attorney, Agent, or Firm* — Artegis Law Group, LLP

(57) ABSTRACT

A technique for generating designs includes: causing one or more candidate designs to be displayed within a virtual-reality (VR) environment; receiving a user input associated with a first candidate design included in the one or more candidate designs via the VR environment; generating a modified design based at least on the user input and the first candidate design; and generating a plurality of output designs via a generative design process based on the modified design.

22 Claims, 6 Drawing Sheets

(51) Int. Cl.
    *G06N 3/0475*     (2023.01)
    *G06F 111/18*     (2020.01)

(56)            References Cited

OTHER PUBLICATIONS

Berti, "Image-based unstructured 3d mesh generation for medical applications." European Congress on Computational Methods in Applied Sciences and Engineering (ECCOMAS). 2004 (Year: 2004).*
Böonning, Ralf, and Heinrich Müuller. "Interactive sculpturing and visualization of unbounded voxel volumes." Proceedings of the seventh ACM symposium on Solid modeling and applications. 2002 (Year: 2002).*
David Cohn, "Autodesk Fusion 360: All-In-One Modeling", Aug. 1, 2018, Article from Digital Engineering 247, accessed via URL: digitalengineering247(dot)com/article/autodesk-fusion-360-all-in-one-modeling (Year: 2018).*
Deering, Michael F. "The HoloSketch VR sketching system." Communications of the ACM 39.5 (1996): 54-61. (Year: 1996).*
Erhan, Halil, Ivy Wang, and Naghmi Shireen. "Interacting with thousands: A parametric-space exploration method in generative design." Proceedings of the 2014 Conference of the Association for Computer Aided Design in Architecture. ACADIA. 2014 (Year: 2014).*
Krish, Sivam. "A practical generative design method." Computer-Aided Design 43.1 (2011): 88-100. (Year: 2011).*
Merrell, Paul, et al. "Interactive furniture layout using interior design guidelines." ACM transactions on graphics (TOG) 30.4 (2011): 1-10. (Year: 2011).*
Miranda, "How architects are using virtual reality to walk through Buildings that don't yet exist", Jul. 3, 2018, Los Angeles Times, www(dot)latimes(dot)com/entertainment/arts/miranda/la-et-cam-architecture-vr-ocma-building-morphosis-20180703-story(dot)html (Year: 2018).*
Monteiro, Pedro, et al. "Comparison of radial and panel menus in virtual reality." IEEE Access 7 (2019): 116370-116379 (Year: 2019).*
Raluca Budiu, "Expandable Menus: Pull-Down, Square, or Pie?", May 8, 2016, Nielsen Norman Group, Article, URL: www(dot)nngroup(dot)com/articles/expandable-menus/ (Year: 2016).*
Regenbrecht, Holger, et al. "Preaching voxels: An alternative approach to mixed reality." Frontiers in ICT 6 (2019): 7 (Year: 2019).*
Rüth, Benjamin, Philipp Emanuel Stelzig, and Dirk Hartmann. "Computer-Aided Design in Virtual Reality." (2017). Master's Thesis. Technical University of Munich (Year: 2017).*
Schkolne, Steven. 3-D Interfaces for Spatial Construction. Diss. California Institute of Technology, 2004. (Year: 2004).*
Schrum, Jacob, et al. "Interactive evolution and exploration within latent level-design space of generative adversarial networks." Proceedings of the 2020 Genetic and Evolutionary Computation Conference. 2020. (Year: 2020).*
Shireen, Naghmi, Halil Erhan, and Robert Woodbury. "Encoding design process using interactive data visualization." Computer-Aided Architectural Design. "Hello, Culture" 18th International Conference, CAAD Futures 2019, Daejeon, Republic of Korea, Jun. 26-28, 2019, Selected Papers 18. (Year: 2019).*
Shu, Dule, et al. "3d design using generative adversarial networks and physics-based validation." Journal of Mechanical Design 142.7 (2020): 071701. (Year: 2020).*
Singh, Rajhans, et al. "Non-parametric priors for generative adversarial networks." International Conference on Machine Learning. PMLR, 2019. (Year: 2019).*
Sixuan Li, "Generative Design", Medium Article, Mar. 20, 2019, URL: medium(dot)com/@sixuanli/generative-design-61cdb7fa89fb (Year: 2019).*
Young, P. G., et al. "An efficient approach to converting three-dimensional image data into highly accurate computational models." Philosophical Transactions of the Royal Society A: Mathematical, Physical and Engineering Sciences 366.1878 (2008) (Year: 2008).*
Zaman, Loutfouz, et al. "Gem-ni: A system for creating and managing alternatives in generative design." Proceedings of the 33rd annual ACM conference on human factors in computing systems. 2015 (Year: 2015).*
Urban Davis, Josh, et al. "Designing co-creative ai for virtual environments." Proceedings of the 13th Conference on Creativity and Cognition. 2021. (Year: 2021).*
Ban, Seonghoon, and Kyung Hoon Hyun. "3D computational sketch synthesis framework: Assisting design exploration through generating variations of user input sketch and interactive 3D model reconstruction." Computer-Aided Design 120 (2020): 102789. (Year: 2020).*
Dogan, Kemal Mert, et al. "A generative sampling system for profile designs with shape constraints and user evaluation." Computer-Aided Design 111 (2019): 93-112. (Year: 2019).*
Liu, Jerry, Fisher Yu, and Thomas Funkhouser. "Interactive 3D modeling with a generative adversarial network." 2017 International Conference on 3D Vision (3DV). IEEE, 2017. (Year: 2017).*
Terry, Michael, et al. "Variation in element and action: supporting simultaneous development of alternative solutions." Proceedings of the SIGCHI conference on Human factors in computing systems. 2004. (Year: 2004).*
Zhang, Wentai, et al. "3D shape synthesis for conceptual design and optimization using variational autoencoders." International Design Engineering Technical Conferences and Computers and Information in Engineering Conference. vol. 59186. American Society of Mechanical Engineers, 2019 (Year: 2019).*
Zhang, Suiyun, et al. "Stylistic scene enhancement GAN: mixed stylistic enhancement generation for 3D indoor scenes." The Visual Computer 35 (2019): 1157-1169. (Year: 2019).*
Draper, Geoffrey M., and Richard F. Riesenfeld. "Interactive fan charts: A space-saving technique for genealogical graph exploration." Proceedings of the 8th Annual Workshop on Technology for Family History and Genealogical Research (FHTW 2008). Citeseer, 2008 (Year: 2008).*
Keller, Kerstin et al. "Family Tree Visualization." (2010). vis(dot)berkeley(dot)edu/courses/cs294-10-sp10/wiki/images/f/f2/Family_Tree_Visualization_-_Final_Paper(dot)pdf (Year: 2010).*
Marschall, Max, Saqib Aziz, and Christoph Gengnagel. "Alternative means of navigating parameter spaces." Proceedings of IASS Annual Symposia. vol. 2016. No. 17. International Association for Shell and Spatial Structures (IASS), 2016. (Year: 2016).*
John Lockwood, "The Men—and the Women—Who Built the Washington Monument", United States National Archives Prologue Journal, Spring 2016, vol. 48, No. 1 (Year: 2016).*
Chen, Xiang'Anthony, et al. "Forte: User-driven generative design." Proceedings of the 2018 CHI conference on human factors in computing systems. 2018. (Year: 2018).*
Khan, Shahroz, Erkan Gunpinar, and Bekir Sener. "GenYacht: An interactive generative design system for computer-aided yacht hull design." Ocean Engineering 191 (2019): 106462. Abstract, fig. 1 and its accompanying description, § 3.2 (Year: 2019).*
German, Kevin, et al. "Co-designing object shapes with artificial intelligence." International Conference on ArtsIT, Interactivity and Game Creation. Cham: Springer International Publishing, 2019. p. 320 (Year: 2019).*
Hung, Yun-Ning, et al. "Musical composition style transfer via disentangled timbre representations." arXiv preprint arXiv:1905.13567 (2019). (Year: 2019).*
Mertes, Silvan, et al. "An evolutionary-based generative approach for audio data augmentation." 2020 IEEE 22nd international workshop on multimedia signal processing (MMSP). IEEE, 2020. (Year: 2020).*
Zaltron, Nicola, Luisa Zurlo, and Sebastian Risi. "Cg-gan: An interactive evolutionary gan-based approach for facial composite generation." Proceedings of the AAAI Conference on Artificial Intelligence. vol. 34. No. 03. 2020. (Year: 2020).*
Allaire et al., "A level-set method for shape optimization", Comptes Rendus Mathematique, http://doi.org/10.1016/S1631-073X(02)02412-3, vol. 334, No. 12, 2002, pp. 1125-1130.

(56)         References Cited

OTHER PUBLICATIONS

Machuca et al., "Multiplanes: Assisted Freehand VR Drawing", UIST'17, http://doi.org/10.1145/3131785.3131794, Oct. 22-25, 2017, pp. 1-3.

Bendsøe, M.P., "Optimal Shape Design as a Material Distribution Problem", Structural Optimization, vol. 1, http://doi.org/10.1007/BF01650949, 1989, pp. 193-202.

Bendsøe et al., "Topology Optimization: Theory, Methods, and Applications", Springer-Verlag, Berlin Heidelberg, http://doi.org/10.1007/978-3-662-05086-6, 2004, 381 pages.

Brock et al., "Large Scale Gan Training for High Fidelity Natural Image Synthesis", ICLR 2019, http://arxiv.org/abs/1809.11096, 2019, pp. 1-35.

Chang et al., "ShapeNet: An Information-Rich 3D Model Repository", http://arxiv.org/abs/1512.03012, 2015, pp. 1-11.

Chen et al., "Forte: User-Driven Generative Design", CHI 2018, http://doi.org/10.1145/3173574.3174070, Apr. 21-26, 2018, pp. 1-12.

Du et al., "Computational Multicopter Design", ACM Transactions on Graphics, vol. 35, No. 6, Article 227, http://doi.org/10.1145/2980179.2982427, Nov. 2016, pp. 227:1-227:10.

Ehsan et al., "On Design and Evaluation of Human-centered Explainable AI systems", 2019, 6 pages.

Ferguson et al., "TRAINS-95: Towards a Mixed-Initiative Planning Assistant", AIPS Proceedings, 1996, pp. 70-77.

Goodfellow et al., "Generative Adversarial Networks", http://arxiv.org/abs/1406.2661, 2014, pp. 1-9.

Greenberg et al., "Usability Evaluation Considered Harmful (Some of the Time)", Proceeding of the 26th Annual CHI conference on Human factors in computing systems—CHI '08, ACM Press, http://doi.org/10.1145/1357054.1357074, Apr. 5-10, 2008, pp. 111-120.

Hadad et al., "A Two-Step Disentanglement Method", 2018 IEEE/CVF Conference on Computer Vision and Pattern Recognition, http://doi.org/10.1109/CVPR.2018.00087, 2018, pp. 772-780.

Harman, Joshua, "Creating a Memory Palace Using a Computer", CHI '01 Extended Abstracts on Human Factors in Computing Systems (CHI EA '01), Association for Computing Machinery, http://doi.org/10.1145/634067.634306, Mar. 31-Apr. 5, 2001, pp. 407-408.

Lorensen et al., "Marching cubes: A high resolution 3D surface construction algorithm", ACM SIGGRAPH Computer Graphics, vol. 21, No. 4, http://doi.org/10.1145/37402.37422, Jul. 1987, pp. 163-169.

Martínez et al., "Structure and Appearance Optimization for Controllable Shape Design", ACM Transactions on Graphics, vol. 34, No. 6, Article 229, http://doi.org/10.1145/2816795.2818101, Nov. 2015, pp. 229:1-229:11.

Parish et al., "Procedural Modeling of Cities", Proceedings of the 28th annual conference on Computer graphics and interactive techniques (SIGGRAPH '01), Association for Computing Machinery, http://doi.org/10.1145/383259.383292, Aug. 12-17, 2001, pp. 301-308.

Schkolne et al., "Surface Drawing: Creating Organic 3D Shapes with the Hand and Tangible Tools", Proc. CHI '01, Mar. 31-Apr. 4, 2001, pp. 261-268.

Shea et al., "Towards integrated performance-driven generative design tools", Automation in Construction, vol. 14, No. 2, http://doi.org/10.1016/j.autcon.2004.07.002, 2005, pp. 253-264.

Stemasov et al., "Mix&Match: Towards Omitting Modelling Through In-situ Remixing of Model Repository Artifacts in Mixed Reality", arXiv:2003.09169, http://doi.org/10.1145/3313831.3376839, Apr. 25-30, 2020, 12 pages.

Tohidi et al., "Getting the Right Design and the Design Right:Testing Many Is Better Than One", CHI 2006 Proceedings, Apr. 22-27, 2006, pp. 1243-1252.

Tsang et al., "A Suggestive Interface for Image Guided 3D Sketching", CHI 2004, vol. 6, No. 1, http://doi.org/10.1145/985692.985767, Apr. 24-29, 2004, pp. 591-598.

Ulu et al., "DMS2015-33: Generative interface structure design for supporting existing objects", Journal of Visual Languages & Computing, vol. 31, http://doi.org/10.1016/j.jvlc.2015.10.016, 2015, pp. 171-183.

Umetani et al., "Guided Exploration of Physically Valid Shapes for Furniture Design", ACM Transactions on Graphics, vol. 31, No. 4, Article 86, http://doi.acm.org/10.1145/2185520.2185582, Jul. 2012, pp. 86:1-86:11.

Wang et al., "Designing Theory-Driven User-Centric Explainable AI", Proceedings of the 2019 CHI Conference on Human Factors in Computing Systems—CHI '19, ACM Press, http://doi.org/10.1145/3290605.3300831, May 4-9, 2019, pp. 1-15.

Wang et al., "A level set method for structural topology optimization", Computer Methods in Applied Mechanics and Engineering, vol. 192, No. 1, http://doi.org/10.1016/S0045-7825(02)00559-5, 2003, pp. 227-246.

Weichel et al., "MixFab: A Mixed-Reality Environment for Personal Fabrication", Proceedings of the SIGCHI Conference on Human Factors in Computing Systems (CHI '14), Association for Computing Machinery, http://doi.org/10.1145/2556288.2557090, Apr. 26-May 1, 2014, pp. 3855-3864.

Wesche et al., "FreeDrawer—A Free-Form Sketching System on the Responsive Workbench", Proceedings of the ACM symposium on Virtual reality software and technology (VRST '01), Association for Computing Machinery, http://doi.org/10.1145/505008.505041, Nov. 15-17, 2001, pp. 167-174.

Wiese et al., "Investigating the Learnability of Immersive Free-Hand Sketching", Proceedings of the Seventh Sketch-Based Interfaces and Modeling Symposium (SBIM '10), Eurographics Association, DOI: 10.2312/SBM/SBM10/135-142, 2010, pp. 135-142.

Wu et al., "Learning a Probabilistic Latent Space of Object Shapes via 3D Generative-Adversarial Modeling", In Advances in Neural Information Processing Systems, 2016, pp. 82-90.

Attar et al., "Physics-Based Generative Design", Autodesk Research, CAAD Futures Conference, 2009, pp. 231-244.

Kazi et al., "ChronoFab: Fabricating Motion", Autodesk Research, CHI 2016, DOI: http://dx.doi.org/10.1145/2858036.2858138, May 7-12, 2016, 11 pages.

Arora et al., "Experimental Evaluation of Sketching on Surfaces in VR", Interactions in Virtual Reality, CHI 2017, DOI: http://dx.doi.org/10.1145/3025453.3025474, May 6-11, 2017, pp. 5643-5654.

Weingarten et al., "DreamRooms: Prototyping Rooms in Collaboration with a Generative Process", Graphics Interface, https://doi.org/10.20380/GI2019.19, Jun. 2019, pp. 1-9.

Kazi et al., "DreamSketch: Early Stage 3D Design Explorations with Sketching and Generative Design", UIST 2017, https://doi.org/10.1145/3126594.3126662, Oct. 22-25, 2017, pp. 401-414.

Arora et al., "SymbiosisSketch: Combining 2D & 3D Sketching for Designing Detailed 3D Objects in Situ", Proceedings of the 2018 CHI Conference on Human Factors in Computing Systems, https://dl.acm.org/doi/10.1145/3173574.3173759, Apr. 21-26, 2018, pp. 1-15.

Autodesk, "Generative Design at Airbus", Customer Stories, Retrieved on Sep. 1, 2021 from https://www.autodesk.com/customer-stories/airbus, 20 pages.

Sanders, Robert, "Creative Computers? Here's What You Get When You Design a Chair Using Algorithms", Futurism, Retrieved on Sep. 1, 2021 from https://futurism.com/creative-computers-heres-what-you-get-when-you-design-a-chair-using-algorithms, Oct. 7, 2016, 5 pages.

Matejka et al., "Dream Lens: Exploration and Visualization of Large-Scale Generative Design Datasets", CHI 2018, https://doi.org/10.1145/3173574.3173943, Apr. 21-26, 2018, 12 pages.

Igarashi et al., "A Suggestive Interface for 3D Drawing", Proceedings of the 14th annual ACM symposium on User Interface software and technology, vol. 3, No. 2, https://dl.acm.org/doi/10.1145/502348.502379, 2001, pp. 173-181.

Kumaravel et al., "TutoriVR: A Video-Based Tutorial System for Design Applications in Virtual Reality", CHI 2019, https://doi.org/10.1145/3290605.3300514, May 4-9, 2019, pp. 1-12.

Google, "Tilt Brush by Google", Retrieved on Sep. 1, 2021 from https://www.tiltbrush.com/, 14 pages.

(56) References Cited

OTHER PUBLICATIONS

Calliope, "Supporting Human-AI Creative Collaboration in Virtual Environments", pp. 1-17.

Zhang et al., "VR-IEDA: Integrated Virtual Reality Environment for Engineering Design and Analysis", Application Research of Computers, vol. 25, No. 10, Oct. 2008, 4 pages.

Song et al., "VR Virtual Reality", Architectural Design Spatial Cognition Iteration, Chapter 7: Applications of VR in Architecture and Related Fields, 2019, 4 pages.

Caramella et al., "3D Image Processing—Technology and Clinical Applications", 2008, 7 pages.

* cited by examiner

ARTIFICIAL INTELLIGENCE-BASED TECHNIQUES FOR DESIGN GENERATION IN VIRTUAL ENVIRONMENTS

CROSS-REFERENCE TO RELATED APPLICATIONS

This application claims priority benefit of the United States Provisional Patent Application titled, "ARTIFICIAL INTELLIGENCE-BASED TECHNIQUES FOR COL-LABORATION IN VIRTUAL ENVIRONMENTS," filed on Sep. 2, 2020 and having Ser. No. 63/073,883. The subject matter of this related application is hereby incorporated herein by reference.

BACKGROUND

Field of the Various Embodiments

The various embodiments relate generally to computer science and computer architecture and, more specifically, to artificial intelligence-based techniques for generating designs in virtual environments.

Description of the Related Art

Generative design is a computer-implemented process of design exploration, in which potential design solutions for a given design problem are generated automatically via one or more software applications. In practice, generative design is an iterative process that typically generates numerous potential designs that satisfy the parameters of the given design problem, such as boundary conditions, loading, geometric limits, and other constraints. A designer then sorts through the generated designs and attempts to improve on the best potential designs. In this regard, the designer typically modifies input values for the design problem parameters with values that are likely to result in additional design solutions, where various targeted features of the additional design solutions align more closely with a desired result. Generally, generative design enables designers to explore a much larger number of design solutions than is possible using traditional 3D modeling processes. Generative design also can generate design solutions that are difficult or non-obvious for humans to create using traditional 3D modeling processes.

One drawback of generative design is that a designer cannot provide inputs to generative design applications that directly cause particular features to be included in the design solutions generated by the generative design software. Instead, the designer can only modify the problem parameters in a way that indirectly results in particular features being included in the design solutions generated by the generative software. Accordingly, to generate designs that include a given desired feature, an iterative process has to be followed that can be time-consuming and frustrating for designers. Among other things, a designer has to develop an understanding of how changes to certain problem parameters can produce certain desired features, which is something that can be achieved only through repeated iterations of the generative design process.

Another drawback of generative design is that generative design software operates in a way that prevents designers from staying engaged in the creative process. In this regard, with conventional approaches, a designer inputs certain problem parameters into the software and then has to wait for several minutes or hours before the software generates the potential design solutions. Aside from being inefficient, the continual and protracted interruptions associated with this type of workflow are quite disruptive to the creative process. Further, this workflow can cause the designer to forget the context for the selection of a particular set of problem parameters, which can prevent the designer from following a coherent path in the exploration of possible designs that is enabled by generative design. Without such context, each iteration of the generative design process engaged in by the designer can be disconnected from preceding iterations. As a result, the resulting designs from each iteration do not build on each other coherently, and the modifications for each iteration can be somewhat random.

As the foregoing illustrates, what is needed in the art are more effective ways to generate design solutions via the generative design process.

SUMMARY

One embodiment of the present sets forth a technique for generating designs that includes: causing one or more candidate designs to be displayed within a virtual-reality (VR) environment; receiving a user input associated with a first candidate design included in the one or more candidate designs via the VR environment; generating a modified design based at least on the user input and the first candidate design; and generating a plurality of output designs via a generative design process based on the modified design.

At least one technical advantage of the disclosed techniques relative to the prior art is that the disclosed techniques enable a user to more easily and intuitively modify the desired features of designs generated by generative design software. For example, with the disclosed techniques, a user can directly manipulate specific portions of an object mesh and/or combine multiple designs that include one or more desired features. Accordingly, with the disclosed techniques, a user is not forced to indirectly cause a generative design system to generate a design with a desired feature by iteratively modifying parametric values that are not directly related to the desired feature, such as weighting conditions and bounding geometries. Another advantage of the disclosed techniques is that the user can stay more engaged in the overall design process relative to conventional generative design approaches. In this regard, with the disclosed techniques, a designer can develop additional sets of problem parameters while the generative design software generates potential design solutions for a given set of problem parameters, rather than having to halt the creative process and wait for the results. Further, the visualization of both the design results as well as the history of the design results in a virtual-reality environment enables a designer to visually ascertain the developmental context of each design solution produced in previous iterations of the generative design process. Thus, at a glance, the designer can be reminded of the design decisions associated with each previously generated potential design solution, which, among other things, can directly inform additional design decisions. These technical advantages represent one or more technological improvements over prior art approaches.

BRIEF DESCRIPTIONS OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

Figure 5:
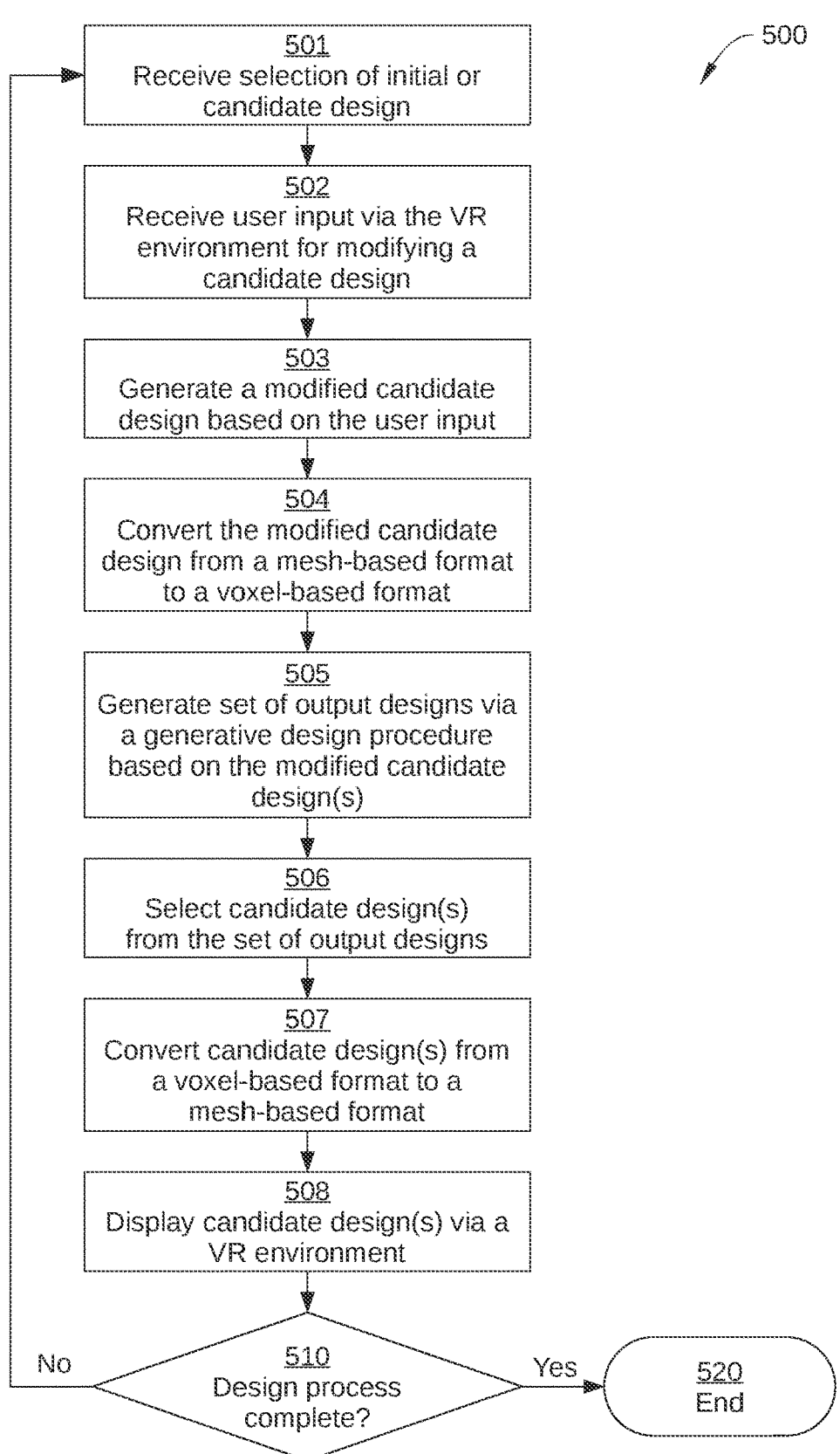

FIG. 5 sets forth a flowchart of method steps for generating designs within a virtual reality environment, according to various embodiments.

Figure 6:
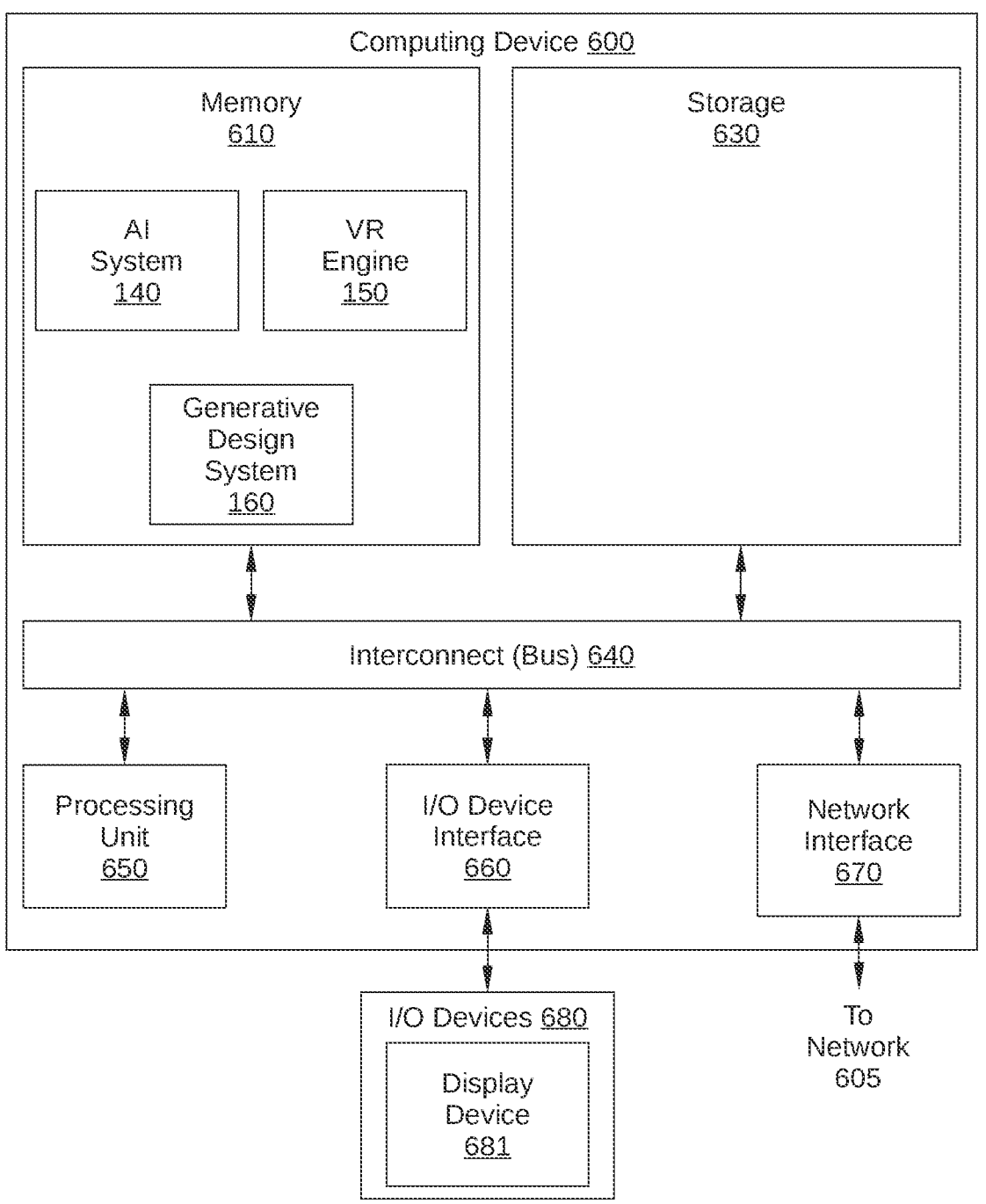

FIG. 6 is a block diagram of a computing device configured to implement one or more aspects of the various embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the embodiments. However, it will be apparent to one of skill in the art that the embodiments may be practiced without one or more of these specific details.

System Overview

Figure 1:
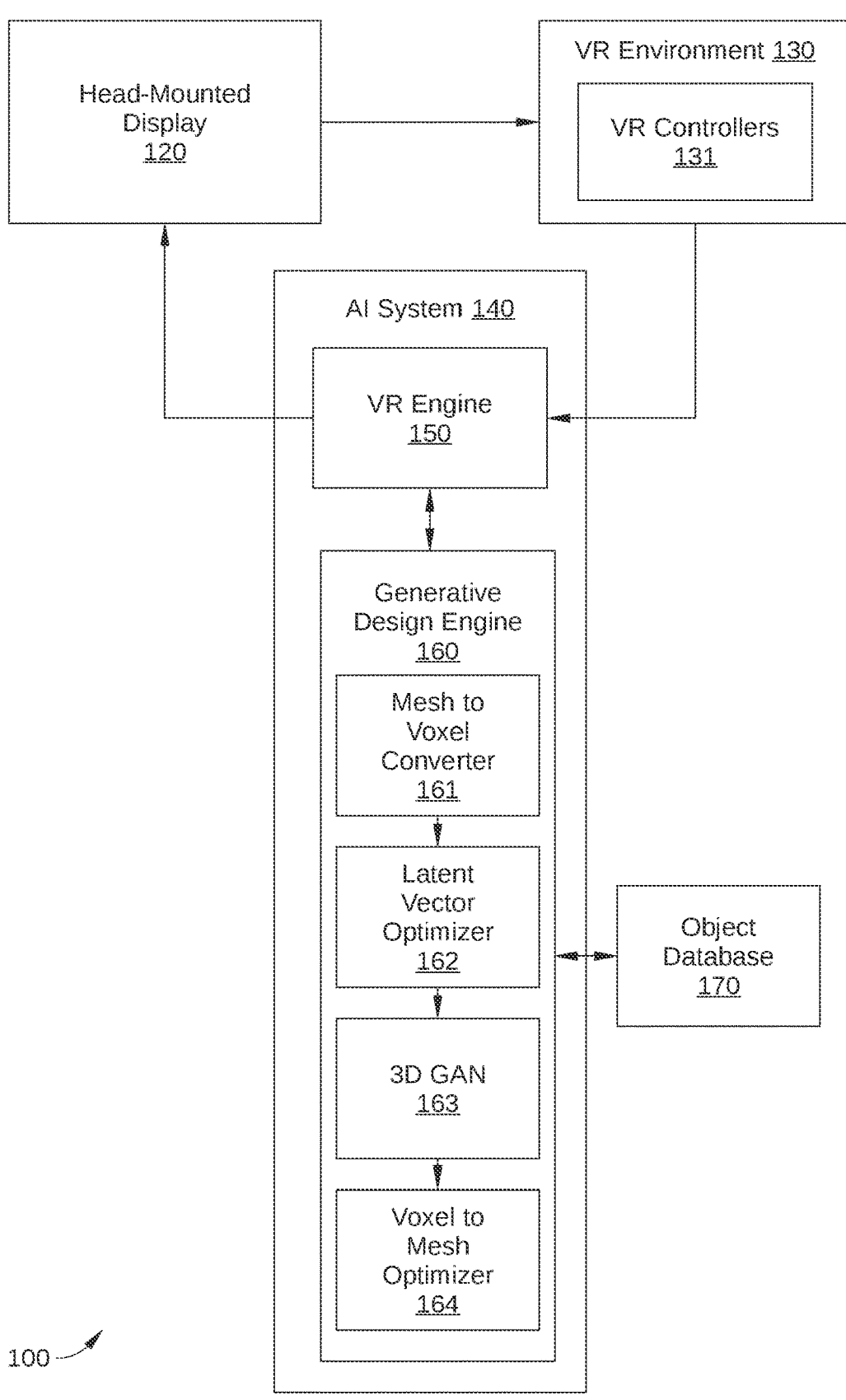
FIG. 1 illustrates a system configured to implement one or more aspects of the various embodiments.

FIG. 1 illustrates a virtual reality (VR) based design system 100 configured to implement one or more aspects of the various embodiments. VR-based design system 100 is configured to enable a user to explore and manipulate generative design solutions in real time. More specifically, VR-based design system 100 leverages the typical idle time associated with a human-AI collaborative design process by providing a virtual environment 130 in which a user (not shown) can perform parallelized exploration of alternative object designs while VR-based design system 100 performs computationally intensive object design generation via a generative design engine 160. Further, a spatial results visualization (not shown in FIG. 1) included in virtual environment 130 facilitates user engagement in the human-AI collaborative design process by visually tracking progress of the object designs produced by each step of the design process. The spatial result visualization draws on the spatial memory of the user, and can visually inform the user of the context of each object design produced by VR-based design system 100, such as the inputs employed to generated each object design. VR-based design system 100 includes a head-mounted display (HMD) 120, virtual environment 130, an artificial intelligence (AI) system 140, and an object database 170.

HMD 120 can be configured to render VR environment 130 for a user. Thus, in some embodiments, HMD 120 is configured to display VR visual elements that are incorporated into the VR environment being presented to the user, such as VR controllers 131 and a spatial result visualization of designs generated by a generative design engine 160 of AI system 140. In some embodiments, HMD 120 is employed by a user in conjunction with one or more interaction devices (not shown), which are devices configured to enable a user to interact with portions of VR environment 130. For example, in some embodiments, such interaction devices include a wired glove that is worn by a user. In such embodiments, the position and orientation of the wired glove and/or the fingers of the wired glove can be detected by interface devices included in HMD 120. Consequently, in such embodiments, the wired glove or a virtual avatar of the user hand wearing the wired glove can be included in VR environment 130, and can be shown interacting with VR controllers 131 and/or the spatial result visualization. Thus, a user wearing the wired glove can make selections and/or operate virtual input devices included in VR controllers 131 that enable control signals to be generated for interacting with the spatial result visualization and/or AI system 140. In some embodiments, interaction devices employed in conjunction with HMD 120 include any device configured to convey the position, movement and/or orientation of the interaction device to HMD 120. In some embodiments, an example of an interaction device is a pointer or wand that includes motion-tracking sensors for determining movement and position and/or optical markers for optical detection of movement and position. In such embodiments, the pointer or wand is held by a user and can be detected and incorporated into VR environment 130. Thus, the user can employ the pointer or wand to selectively interact with VR controllers 131. In some embodiments, an example of interaction devices employed in conjunction with HMD 120 includes one or more wearable devices, such as smart rings, that each include motion-tracking sensors for determining movement and position and/or optical markers for optical detection of movement and position. In such embodiments, certain fingers of the user can be detected and therefore employed to selectively interact with VR controllers 131.

VR environment 130 is generated and managed by VR engine 150 of AI system 140 and is displayed to a user via HMD 120. As noted above, VR environment 130 includes VR controllers 131 and a spatial result visualization of object designs. VR controllers 131 are VR display elements that enable user interactions with object designs included in the spatial result visualization. In VR environment 130, a user sees rendered objects, such as object designs and VR controllers 131, and can manipulate or otherwise interact with such objects via VR controllers 131. One embodiment of VR controllers 131 and an object design are described below in conjunction with FIG. 2.

Figure 2:
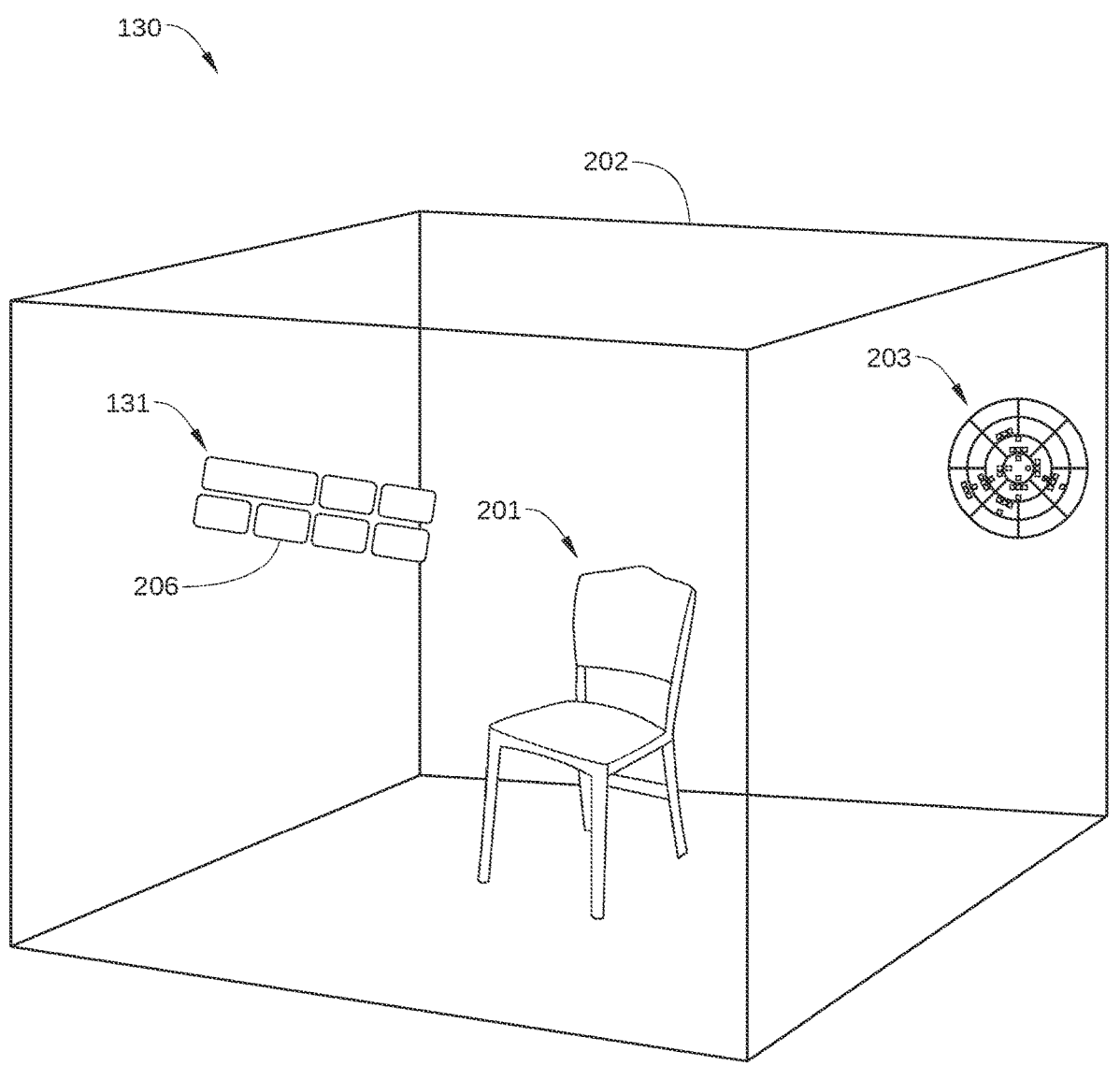
FIG. 2 is a schematic illustration of an object design displayed within a virtual display volume associated with the VR environment of FIG. 1, according to various embodiments.

FIG. 2 is a schematic illustration of an object design 201 displayed within a virtual display volume 202 of VR environment 130, according to various embodiments. Virtual display volume 202 is configured as a virtual vitrine for displaying object design 201. Object design 201 is an example geometric model associated with VR environment 130, such as an object design generated by VR-based design system 100 via a generative design procedure. As such, object design 201 is disposed in virtual display volume 202 and can be reviewed by a user wearing HMD 120 in FIG. 1. In some embodiments, the user can rotate, modify, or otherwise manipulate object design 201 and/or virtual display volume 202, via one or more of VR controllers 131 and/or a virtual avatar of an interaction device (e.g., a wired glove, a pointer, a wand, a stylus, a wearable device, and/or the like).

In some embodiments, VR controllers 131 include a selection of control buttons 206 and/or menus can enable one or more of a variety of functions associated with manipulating, modifying, creating/sculpting, and/or selecting object design 201 as part of a human-AI collaborative design process. Examples of such functions include selecting object design 201 for manipulation, selecting object design 201 for deletion from VR environment 130, selecting object design 201 to be stored as a favorite object design, selecting another object design to be combined with object design 201 to generate one or more candidate designs, selecting an object (for example from object database 170) to be combined with object design 201 to generate one or more candidate designs, enabling a modification of a mesh (not shown) associated with object design 201 via direct user manipulation to generate a candidate design (for example via a virtual avatar associated with an interaction device for HMD 120), creating a new object design 201, enabling selection of a region of object design 201 that is changeable by a generative design procedure performed by generative design engine 160, enabling selection of a region of object design 201 that is not changeable by a generative design procedure performed by generative design engine 160, and/ or the like. Thus, VR controllers 131 enable a user to perform various user operations of a generative design process via VR environment 130.

In some embodiments, a map 203 is included in virtual display volume 202 that indicates a current location of virtual display volume 202 within a spatial result visualization. In such embodiments, map 203 facilitates user navigation within the spatial result visualization, which in some instances can include dozens of different virtual display volumes 202.

Returning to FIG. 1, AI system 140 includes a VR engine 150 and a generative design engine 160. VR engine 150 can be based on any technically feasible virtual reality platform and is configured to enable HMD 120 to generate VR environment 130, VR controllers 131, and a spatial results visualization that includes object designs generated by generative design engine. Embodiments of a spatial results visualization in VR environment 130 are described below in conjunction with FIG. 3.

Generative design engine 160 is a user-driven generative design tool that enables a user to specify high-level design intents. Generative design engine 160 is configured to systematically produce candidate design solutions using generative algorithms based on user inputs received via AR environment 130. In the embodiment illustrated in FIG. 1, generative design engine 160 includes a mesh-to-voxel converter 161, a latent vector optimizer 162, a 3-dimensional (3D) generative adversarial network (GAN) 163, and a voxel-to-mesh optimizer 164.

Mesh-to-voxel converter 161 is configured to convert a mesh-based representation of an object design to a voxel-based representation of the object design employed by GAN 163. Latent vector optimizer 162 is configured to perform latent vector optimization on the voxel-based representation of the object design. Voxel-to-mesh optimizer 164 is configured to convert a voxel-based representation of an object design that is generated by GAN 163 to a mesh-based representation of the object design that can be rendered in VR environment 130 by VR engine 150, such as a voxel array. In some embodiments, an object design generated by GAN 163 is rendered from a voxel array to a mesh using a Marching Cubes approach. In some embodiments, such a mesh is then refined using Laplacian smoothing before being imported into VR environment 130.

GAN 163 can be any technically feasible and suitably trained generative adversarial network, and generally includes a generator and a discriminator. The generator synthesizes convincing objects that fool the discriminator, while the discriminator attempts to distinguish between ground-truth objects (such as 3D objects from object database 170) and objects synthesized by the generator. Training consists of the generator learning how to create 3D objects by adjusting weights corresponding to object features. Once trained, the resulting generator is able to produce, and interpolate between, the selected domain of objects taken from object database 170. In some embodiments, the generator creates a representation of a 3D object by randomly sampling a z vector from a probabilistic latent space. This many-dimensional (e.g., on the order of 200) latent z vector maps to a voxel cube representing an object in 3D voxel space. For example, in some embodiments, the voxel cube has dimensions 64×64×64. The probabilistic latent space is the solution space of possible objects generated by the system. Therefore, each z vector sampled from the latent space represents a novel object resulting from an interpolation of the many dimensions of the latent space. In such embodiments, each dimension of the latent space therefore represents a different geometrical aspect of the object.

VR Spatial Interaction Environment

According to various embodiments, a spatial results visualization is rendered in VR environment 130 and is progressively populated with candidate designs over the course of a human-AI collaborative design process. Additional rooms are spawned with each iteration of such a design process as new candidate designs are generated. Embodiments of a spatial results visualization are described below in conjunction with FIG. 3.

Figure 3:
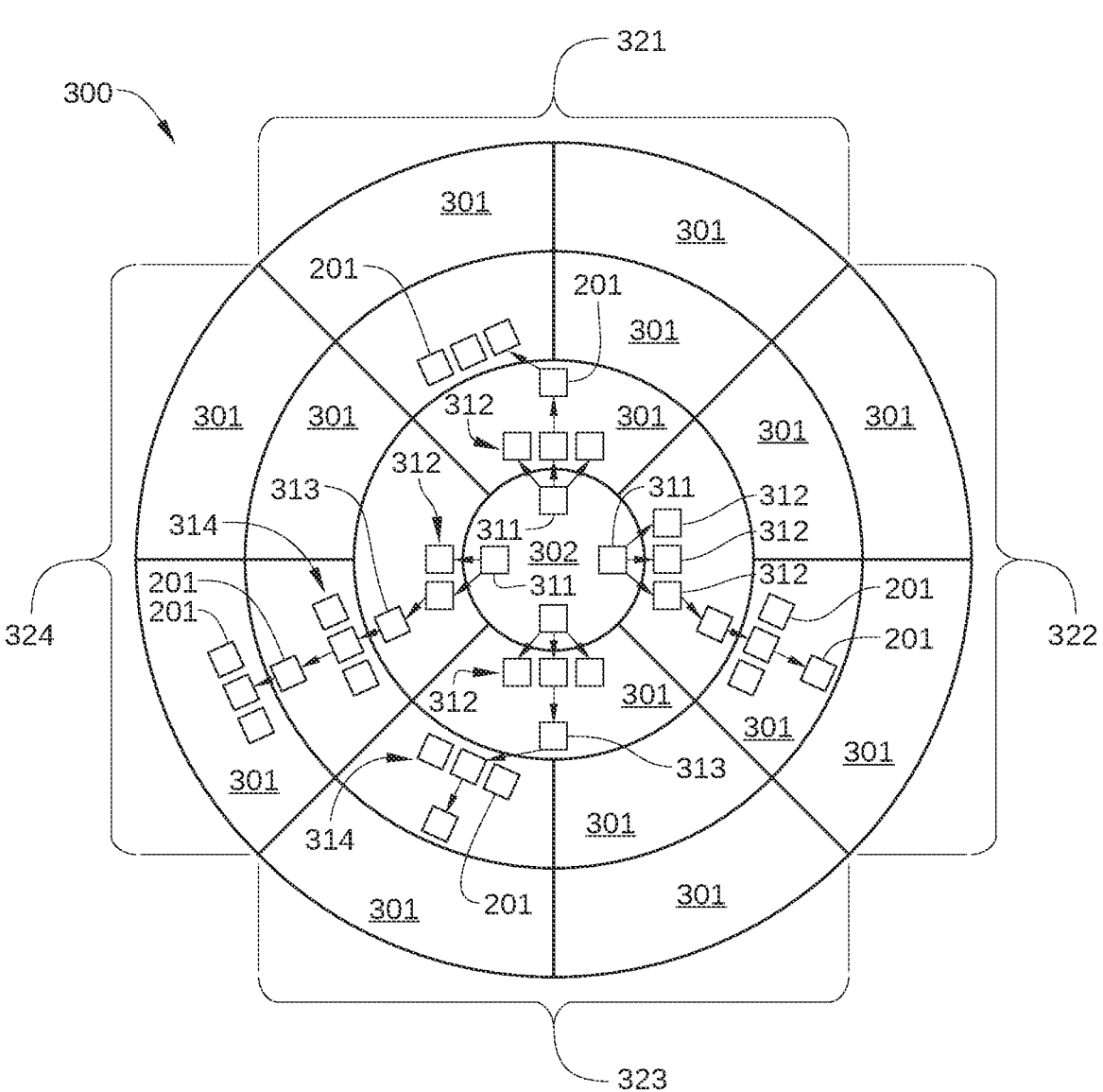
FIG. 3 is a schematic illustration of a spatial results visualization included in the VR environment of FIG. 1, according to various embodiments.

FIG. 3 is a schematic illustration of a spatial results visualization 300 included in VR environment 130, according to various embodiments. In the embodiment illustrated in FIG. 3, spatial results visualization 300 is a data visualization scheme based on a VR implementation of a radial graph, and includes a plurality of virtual display regions, or rooms 301. In other embodiments, spatial results visualization 300 can have any other graphical configuration, such as rectangular layout that includes multiple columns of rooms 301. Further, in the embodiment illustrated in FIG. 3, spatial results visualization 300 is depicted in two dimensions, but in practice, spatial results visualization 300 is generally implemented as a 3D representation of object designs, and a user can employ 3D navigation in VR environment 130 to review object designs included in spatial results visualization 300.

In operation, rooms 310 are progressively populated with object designs 201 as candidate designs are generated by VR-based design system 100. For example, starting from an initial room 302, a user causes object designs 312 to be generated by generative design engine 160 based on initial designs 311.

Each of initial designs 311 can be a variation of a particular object, such as an article of furniture, a car body, a vase, an art piece, or any other class of object for which generative design engine 160 has been trained to generate designs. Based on each initial design 311, generative design engine 160 generates a set of candidate designs 312. For each initial design 311, such candidate designs 312 are displayed in a single room 301 of spatial results visualization 300, and can be reviewed by the user. In a particular room 301 of VR environment 130, the user can then discard or mark as a favorite each of the candidate designs 312 in the room 301. In addition, the user can generate one or more modified designs 313 by modifying one or more of the candidate designs 312 in the room. Generative design engine 160 then generates a further set of candidate designs 314, which are used to populate another room 301 of VR environment 130. Thus, VR-based design system 100 enables the user to inspect the visual appearance of object designs generated by generative design engine 160, directly edit the geometry of such object designs, and receive design input from generative design engine 160. Further, rooms 301 of spatial results visualization 300 are sequentially populated with object designs 201 as the object designs are generated in the human-AI collaborative design process. Thus, spatial results visualization 300 produces a visual representation of the lineage of the candidate designs throughout the generative design process.

In some embodiments, different regions of spatial results visualization 300 are associated with different object classes or categories, which can facilitate the spatial memory of a user when reviewing previously generated object designs. In the embodiment illustrated in FIG. 3, spatial results visualization 300 includes four quadrants 321, 322, 323, and 324, each of which can be generally associated with a particular category of object designs. For example, in one instance, each initial design 311 is a design for a different category of chair, such as a chair with no arms, a chair with a single arm, a chair with two arms, and a chair with a table attachment. As generative design engine 160 generates object designs over the course of a generative design process, rooms 301 are progressively populated with object designs that are based on the object designs of an adjacent room 301. Thus, in such an instance, quadrant 321 may generally include object designs of chairs with no arms, quadrant 322 may generally include object designs of chairs with a single arm, quadrant 323 may generally include object designs of chairs with two arms, and quadrant 324 may generally include object designs of chairs with table attachments. As a result, a user can visualize the design process of a particular object design by visually navigating the lineage of that object design within spatial results visualization 300. In this way, the context for design decisions can be more readily recalled by the user, and re-engaging in the design process does not involve sorting through a random collection of previously generated object designs to determine previous design decisions.

In some embodiments, spatial results visualization 300 further facilitates visualization of a generative design process by associating certain visual indicators with certain rooms 301, groups of rooms, and/or object designs 201. Such visual indicators may include color coding, striping, visual textures, and/or the like. For example, in some embodiments, a group of rooms 301 of spatial results visualization 300 are color-coded based on which initial design they are linked to. Alternatively or additionally, in some embodiments, an object design 201 is color-coded based on which operation or operations were employed in the generation of the object design 201. For example, in such an embodiment, object designs 201 generated via a mesh manipulation performed by a user are indicated with a first color, object designs 201 generated by the combination of two existing object designs 201 are indicated with a second color, object designs 201 generated by the combination of an existing object design 201 and an object from object database 170 are indicated with a third color, object designs 201 that have been deleted by the user are indicated with a fourth color, and so on. Thus, in such embodiments, a user can quickly survey the object designs 201 currently included in spatial results visualization 300 and determine the operations employed in the generation of such object designs 201 at a glance.

In some embodiments, an object design 201 in one room 301 is selected, modified, and/or combined with another object design 201, and generative design engine 160 generates a new set of candidate designs in a new room. One such embodiment is illustrated in FIG. 4.

Figure 4:
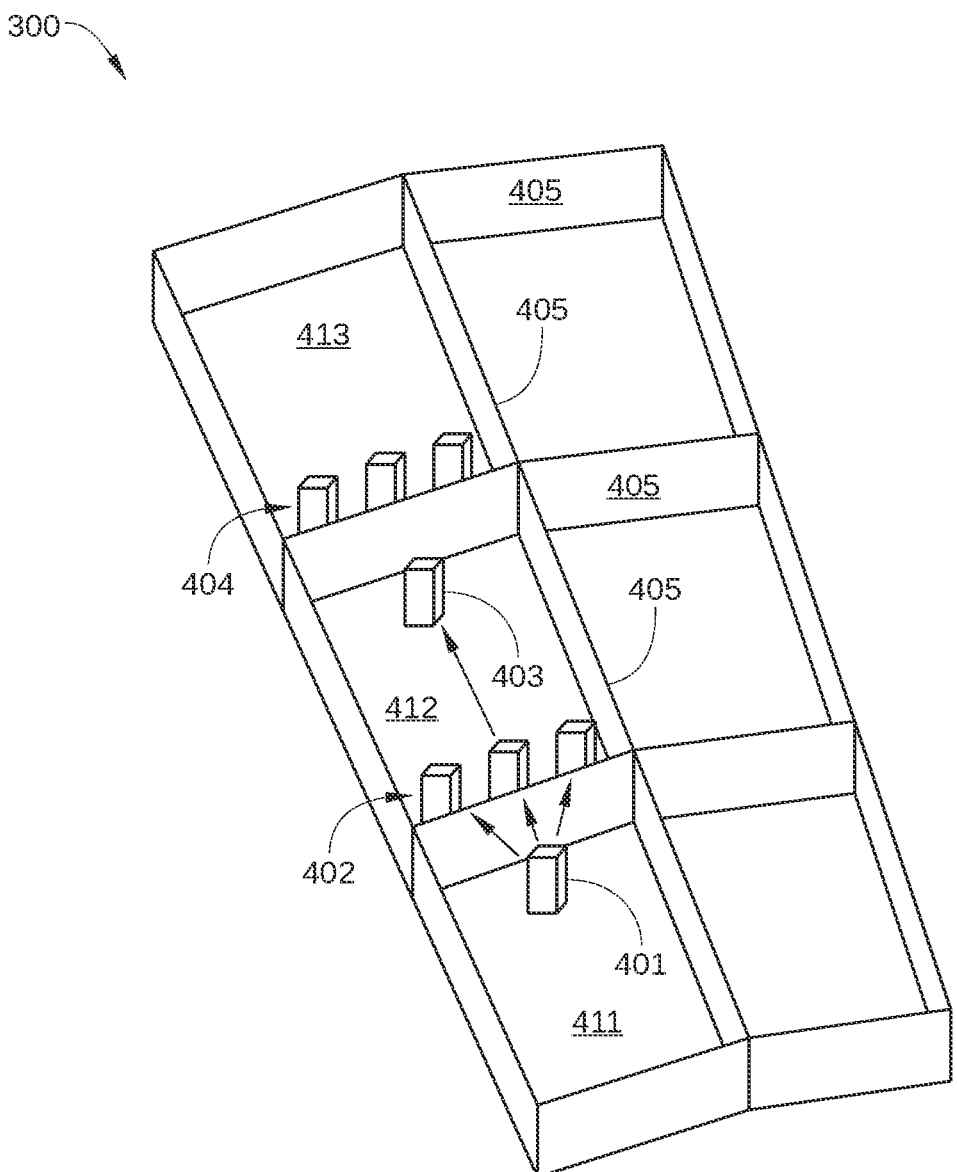
FIG. 4 is a more detailed illustration of a portion of the spatial results visualization of FIG. 3, according to various embodiments.

FIG. 4 is a more detailed illustration of a portion of spatial results visualization 300, according to various embodiments. In the embodiment illustrated in FIG. 4, a user has generated a modified design 401 in a room 411 and caused generative design engine 160 to generate a set of candidate designs 402 based on modified design 401. For instance, in some embodiments, modified design 401 may be a mutation or combination of two previously generated object designs (not shown) already included in one or more rooms of spatial results visualization 300. In some embodiments, modified design 401 may be a mutation or combination of a previously generated object design and an object from object database 170. Thus, in such embodiments, a user can introduce one or more features from objects that are not already included in the object designs of spatial results visualization 300. In some embodiments, modified design 401 may be an object design included in spatial results visualization 300 that has been directly edited by the user in VR environment 130, for example via voxel addition, deletion, translation, and/or extrusion.

As shown, the set of candidate designs 402 are positioned in a different room 412 that is newly spawned for candidate designs 402. Thus, candidate designs 402, which are based at least in part on modified design 401, are positioned in a different room than modified design 401. In addition, the user has further generated a modified design 403 based on one of candidate designs 402 and has caused generative design engine 160 to generate a set of candidate designs 404 based on modified design 403. Similar to candidate designs 402, candidate designs 404 are disposed in a new room 413 of spatial result visualization 300. One or more of candidate designs 404 can then be further modified as the human-AI collaborative design process continues.

It is noted that, based on a modified design such as modified design 401 or modified design 403, generative design engine 160 typically generates a large number of output designs that are possible object designs, for example hundreds, thousands, or more. Such large numbers of output designs cannot realistically be reviewed by a user in a normal human-AI collaborative design process. Accordingly, in some embodiments, generative design engine 160 selects a small number of output designs as the candidate designs for a particular application of generative design engine 160. In some embodiments, the number of output designs selected as candidate designs for display is fixed, for example at three or four. In some embodiments, the number of output designs selected as candidate designs for display is a user-selected number. In some embodiments, the number of output designs selected as candidate designs for display is based on which particular operation or operations were performed on the associated modified design.

In the embodiment illustrated in FIG. 4, the rooms of spatial result visualization 300 are separated by walls 405 to visually isolate an object design of interest from other object designs disposed in adjacent rooms. In some embodiments, walls 405 may be removed, lowered, penetrated with doors, rendered transparent, or otherwise modified once an adjacent room is populated with candidate designs and can be virtually entered by the user. In other embodiments, any other suitable visual separation and/or barrier can be included in spatial result visualization 300 to indicate which candidate designs have been generated in a particular application of generative design engine 160 and therefore are associated with each other.

For clarity, modified design 401, candidate designs 402, modified design 403, and candidate designs 404 are all depicted in FIG. 4 as virtual display volumes or "virtual vitrines." In practice, each object design populating spatial results visualization 300 is generally visible to the user and available for visual inspection.

Design Generation in a Spatial Interaction Environment

FIG. 5 sets forth a flowchart of method steps for generating designs in a VR environment, according to various embodiments. Although the method steps are described in conjunction with the systems of FIGS. 1-4, persons skilled in the art will understand that any system configured to perform the method steps, in any order, is within the scope of the embodiments.

As shown, a method 500 begins at step 501, where generative design engine 160 receives a selection for initial design 311 or for a candidate design to be modified. In a first iteration of steps 501-510, a selection for initial design 311 is received, for example via user inputs received from initial room 302 of spatial results visualization 300. In some embodiments, VR controllers 131 for initial room 311 provide multiple options to the user for generating initial design 311. Examples of such options may include "sculpt" (to indicate a new mesh from scratch is to be sculpted), and "generate" (to select an object from one of multiple available object classes). Once an object design is selected to be sculpted or selected from a menu of available object classes by the user, that object design is received by generative design engine 160 as initial design 311. Generative design engine 160 then displays initial design 311 in a virtual display volume 202 of initial room 302 and method 500 proceeds to step 502.

In some embodiments, VR controllers 131 for initial room 311 are configured to enable a user to define and begin multiple generative design processes via generative design engine 160. In such embodiments, an initial design 311 may be selected in multiple iterations of steps 401.

In subsequent iterations of steps 501-510, i.e., after initial designs 311 have been selected, a selection of a candidate design generated by generative design engine 160 is received in step 501. Generative design engine 160 then displays the selected candidate design in a virtual display volume 202 of the current room and method 500 proceeds to step 502.

In step 502, generative design engine 160 receives one or more user inputs via VR controllers 131 for modifying the initial or candidate design. For example, a new mesh can be sculpted from scratch using a brush-like interaction, an existing candidate design can be modified via inputs indicating direct mesh manipulation of a mesh associated with the candidate design or initial design, multiple existing candidate designs can be selected to be combined or mutated together, etc. In some embodiments, the user can modify and/or sculpt a surface mesh of a particular object design with pushing, pulling, selecting, and/or deleting inputs. In such embodiments, such inputs may be performed using a traditional ray-casting point-and-click interaction common to conventional mesh sculpting platforms. In some embodiments, the mesh sculpting inputs and/or the mesh manipulation inputs can indicate relatively coarse modifications to the initial design or candidate design, since generative design engine 160 creates many instances of finer details as part of the generative design procedure.

In step 503, generative design engine 160 generates a modified candidate design based on the user inputs from step 502, and displays the modified candidate design in a virtual display volume 202 of the current room. In some embodiments, the modified candidate design is displayed in the same virtual display volume 202 while the modifications are performed by the user.

In step 504, generative design engine 160 converts the modified candidate design from a mesh-based format to a voxel-based format, for example via mesh-to-voxel converter 161. In some embodiments, mesh-to-voxel converter 161 enables a more rapid sculpting process by automating one or more aspects of the mesh sculpting/modifying process, such as performing mesh cleaning and/or mesh repairing operations to ensure water-tightness of the user-manipulated mesh.

In some embodiments, 3D GAN 163 includes a generator that creates a representation of a 3D object (e.g., an object design) by randomly sampling a z vector from a probabilistic latent space. This high-dimension latent z-vector maps to a voxel cube that represents an object in 3D voxel space. In such embodiments, the probabilistic latent space, refers to the solution space of possible objects generated by the system. Therefore, each z vector sampled from the latent space represents a novel object resulting from an interpolation of the many dimensions of the latent space, where each dimension of the latent space can represent a different geometrical aspect of the object design. In such embodiments, to enable mutation or combination of a GAN-generated object design and a directly manipulated object design, a technique for locating a given object geometry within the latent space is employed, for example via latent vector optimizer 162. In such embodiments, the weights of the GAN are frozen, the manipulated mesh is vectorized, and a latent z vector is optimized that best represents the features of the manipulated mesh within the latent space. In this way, interpolation between directly manipulated objects and GAN generated objects can be performed in step 504.

In step 505, generative design engine 160 generates a set of output designs via a generative design procedure based on the modified candidate design(s) and/or initial design 311 received in the current iteration of steps 501-510. As noted above, in some embodiments, a latent z vector associated with the modified candidate design(s) and/or initial design 311 is optimized that best represents the features of each modified object design. Typically, generative design engine 160 generates a plurality of output designs in step 505, for example on the order of hundreds, thousands, or more.

In step 506, generative design engine 160 selects a number of candidate designs from the set of output designs generated in step 505. In some embodiments, generative design engine 160 selects the candidate designs in step 506 based on latent z vectors associated with each of the plurality of output designs generated in step 505. In other embodiments, any other suitable selection criteria can be employed in step 506 to select certain output designs to be candidate designs.

In step 507, generative design engine 160 converts the candidate design(s) selected in step 506 from a voxel-based format to a mesh-based format. In some embodiments, the candidate designs are rendered from voxel arrays to meshes using a Marching Cubes procedure and then refined using Laplacian smoothing before being imported into VR environment 130. Thus, the candidate design(s) generated by generative design engine 160 are renderable in VR environment 130.

In step 508, VR engine 150 causes the candidate design(s) to be displayed in VR environment 130. Specifically, the candidate design(s) selected in step 506 are displayed together in a new room of spatial result visualization 300. In some embodiments, to facilitate user review of each candidate design, each candidate design is displayed in a respective virtual display volume 202 in the room.

In step 510, AI system 140 determines whether the human-AI collaborative design process is complete. For example, in some embodiments, the human-AI collaborative design process is complete when a user input indicates that no further design modifications are to be performed. In other embodiments, the human-AI collaborative design process is complete when some other termination criterion is met, such as a threshold number of candidate designs being generated, a threshold number of rooms being generated in spatial results virtualization 300, a threshold time interval associated with object design generation being exceeded, and the like. When AI system 140 determines that the human-AI collaborative design process is complete, method 500 proceeds to step 520 and terminates; when AI system 140 determines that the human-AI collaborative design process is not complete, method 500 returns to step 501.

Exemplary Computing Device

FIG. 6 is a block diagram of a computing device 600 configured to implement one or more aspects of the various embodiments. Computing device 600 may be a server machine, desktop computer, a laptop computer, a tablet computer, or any other type of computing device configured to receive input, process data, generate control signals, and display images. Computing device 600 is configured to run AI system 140, VR engine 150, generative design engine 160, and/or other suitable software applications, which can reside in a memory 610. It is noted that the computing device described herein is illustrative and that any other technically feasible configurations fall within the scope of the present disclosure.

As shown, computing device 600 includes, without limitation, an interconnect (bus) 640 that connects a processing unit 650, an input/output (I/O) device interface 660 coupled to input/output (I/O) devices 680, memory 610, a storage 630, and a network interface 670. Processing unit 650 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 650 may be any technically feasible hardware unit capable of processing data and/or executing software applications, including run AI system 140, VR engine 150, and/or generative design engine 160. Further, in the context of this disclosure, the computing elements shown in computing device 600 may correspond to a physical computing system (e.g., a system in a data center) or may be a virtual computing instance executing within a computing cloud.

I/O devices 680 may include devices capable of providing input, such as a keyboard, a mouse, a touch-sensitive screen, and so forth, as well as devices capable of providing output, such as a display device 681. Additionally, I/O devices 680 may include devices capable of both receiving input and providing output, such as a touchscreen, a universal serial bus (USB) port, and so forth. I/O devices 680 may be configured to receive various types of input from an end-user of computing device 600, and to also provide various types of output to the end-user of computing device 600, such as one or more graphical user interfaces (GUI), displayed digital images, and/or digital videos. In some embodiments, one or more of I/O devices 680 are configured to couple computing device 600 to a network 605.

Memory 610 may include a random access memory (RAM) module, a flash memory unit, or any other type of memory unit or combination thereof. Processing unit 650, I/O device interface 660, and network interface 670 are configured to read data from and write data to memory 610. Memory 610 includes various software programs that can be executed by processor 650 and application data associated with said software programs, including run AI system 140, VR engine 150, and/or generative design engine 160.

In sum, the embodiments provide techniques for a VR-based generative design system. Design decisions and modifications are performed in a VR environment. The VR environment also presents the design history of the various output designs in an easily understood spatial visualization.

At least one technical advantage of the disclosed techniques relative to the prior art is that the disclosed techniques enable a user to easily and intuitively implement modifications to the features of a design produced by a generative design system. For example, the user can directly manipulate specific portions of an object mesh and/or combine multiple designs that include desired features. Thus, the user is not forced to indirectly cause a generative design system to generate a design with a desired feature by iteratively modifying parametric values that are not directly related to the desired feature, such as weighting conditions and bounding geometries. Another advantage of the disclosed techniques is that the user can stay engaged in the design process. During the idle time associated with the solution of one set of problem parameters, the designer can develop additional sets of problem parameters, rather than halting the creative process and waiting for results. Further, the visualization of the design results and the design history of the design results in a virtual-reality environment enables the designer to visually ascertain the developmental context for each design solution produced in previous iterations of the design process. Thus, at a glance the designer can be reminded of what design decisions are associated with each previously produced design solution, which can directly inform future design decisions. These technical advantages represent one or more technological improvements over prior art approaches.

1. In some embodiments, a computer-implemented method for generating designs includes: causing one or more candidate designs to be displayed within a virtual-reality (VR) environment; receiving a user input associated with a first candidate design included in the one or more candidate designs via the VR environment; generating a modified design based at least on the user input and the first candidate design; and generating a plurality of output designs via a generative design process based on the modified design.

2. The computer-implemented method of clause 1, wherein the user input indicates a modification of a mesh associated with the first candidate design, a combination of the first candidate design and a second candidate design included in the one or more candidate designs, a region of the first candidate design that is changeable, or a region of the first candidate design that is not changeable.

3. The computer-implemented method of clauses 1 or 2, wherein generating the modified design comprises performing a linear interpolation between the first candidate design and the second candidate design.

4. The computer-implemented method of any of clauses 1-3, wherein the linear interpolation is based on a first z-vector sampled from a probabilistic latent space associated with the first candidate design and a second z-vector sampled from a probabilistic latent space associated with the second candidate design.

5. The computer-implemented method of any of clauses 1-4, wherein the first candidate design is associated with a first object class, and the second candidate designs is associated with a second object class.

6. The computer-implemented method of any of clauses 1-5, wherein the first object class is associated with designs generated by the generative design process, and the second object class is associated with objects that are not generated by the generative design process.

7. The computer-implemented method of any of clauses 1-6, wherein the first object class is associated with a first category of designs generated by the generative design process, and the second object class is associated with a second category of designs generated by the generative design process.

8. The computer-implemented method of any of clauses 1-7, further comprising, prior to causing the one or more candidate designs to be displayed, converting the one or more candidate designs from a voxel-based format to a mesh-based format.

9. The computer-implemented method of any of clauses 1-8, wherein the user input comprises a user gesture performed within the VR environment.

10. The computer-implemented method of any of clauses 1-9, further comprising, prior to causing the one or more candidate designs to be displayed, generating a plurality of output designs via the generative design process based on an initial design.

11. A non-transitory computer readable medium storing instructions that, when executed by a processor, cause the processor to perform the steps of: causing one or more candidate designs to be displayed within a virtual-reality (VR) environment; receiving a user input associated with a first candidate design included in the one or more candidate designs via the VR environment; generating a modified design based at least on the user input and the first candidate design; and generating a plurality of output designs via a generative design process based on the modified design.

12. The non-transitory computer readable medium of clause 11, wherein causing the one or more candidate designs to be displayed comprises positioning the one or more candidate designs within a first virtual display region of the VR environment.

13. The non-transitory computer readable medium of clauses 11 or 12, wherein the first virtual display region includes a different virtual display volume for each of the one or more candidate designs.

14. The non-transitory computer readable medium of any of clauses 11-13, wherein the first virtual display region includes at least one virtual display volume for the modified design.

15. The non-transitory computer readable medium of any of clauses 11-14, storing instructions that, when executed by a processor, cause the processor to perform the step of causing the modified design to be displayed within a virtual display volume included in the first virtual display region.

16. The non-transitory computer readable medium of any of clauses 11-15, storing instructions that, when executed by a processor, cause the processor to perform the step of causing at least one output design included in the plurality of output designs to be displayed within a second virtual display region of the VR environment.

17. The non-transitory computer readable medium of any of clauses 11-16, wherein the second virtual display region is adjacent to the first virtual display region.

18. The non-transitory computer readable medium of any of clauses 11-17, wherein the first virtual display region and the second virtual display region are displayed within a radial graph, and the first virtual display region is positioned closer to a central portion of the radial graph than the second virtual display region is.

19. The non-transitory computer readable medium of any of clauses 11-18, wherein the VR environment is configured as a radial graph in which virtual display volumes are progressively populated with candidate designs as the candidate designs are generated by succeeding iterations of the generative design process.

20. A system, comprising: a memory that stores instructions; and a processor that is communicatively coupled to the memory and is configured to, when executing the instructions, perform the steps of: causing one or more candidate designs to be displayed within a virtual-reality (VR) environment; receiving a user input associated with a first candidate design included in the one or more candidate designs via the VR environment; generating a modified design based at least on the user input and the first candidate design; and generating a plurality of output designs via a generative design process based on the modified design.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating designs, the method comprising:

displaying one or more candidate designs within a virtual-reality (VR) environment;

receiving a user input indicating a modification of a mesh of a first candidate design included in the one or more candidate designs via the VR environment;

generating a modified design based on the modification of the mesh of the first candidate design;

generating, by a generative design engine, a plurality of output designs based on the modified design, wherein the generative design engine freezes weights associated with the generative design engine, identifies a vector in a latent space that represents a voxelated version of the user-modified design, and modifies the voxelated version of the modified design to generate each of the output designs; and displaying at least one output design included in the plurality of output designs within the VR environment.

2. The computer-implemented method of claim 1, wherein the user input indicating the modification of the mesh associated with the first candidate design further indicates a combination of the first candidate design and a second candidate design included in the one or more candidate designs, a region of the first candidate design that is changeable, or a region of the first candidate design that is not changeable.

3. The computer-implemented method of claim 1, wherein the user input further indicates a combination of the first candidate design and a second candidate design, and wherein generating the modified design comprises performing a linear interpolation between the first candidate design and the second candidate design.

4. The computer-implemented method of claim 3, wherein the linear interpolation is based on a first z-vector sampled from a probabilistic latent space associated with the first candidate design and a second z-vector sampled from a probabilistic latent space associated with the second candidate design.

5. The computer-implemented method of claim 1, wherein the user input further indicates a combination of the first candidate design and a second candidate design, and wherein the first candidate design is associated with a first object class, and the second candidate design is associated with a second object class.

6. The computer-implemented method of claim 5, wherein the first object class is associated with the plurality of output designs generated by the generative design engine, and the second object class is associated with objects that are not generated by the generative design engine.

7. The computer-implemented method of claim 5, wherein the first object class is associated with a first category of the plurality of output designs generated by the generative design engine, and the second object class is associated with a second category of the plurality of output designs generated by the generative design engine.

8. The computer-implemented method of claim 1, further comprising, prior to displaying the one or more candidate designs, converting the one or more candidate designs from a voxel-based format to a mesh-based format.

9. The computer-implemented method of claim 1, wherein the user input comprises a user gesture within the VR environment.

10. The computer-implemented method of claim 1, further comprising, prior to displaying the one or more candidate designs, generating a plurality of object designs via the generative design engine based on an initial design.

11. The computer-implemented method of claim 1, wherein the user input comprises receiving, via one or more VR controllers, a user gesture for sculpting a surface mesh within the VR environment.

12. The computer-implemented method of claim 1, wherein the user input indicating the modification of the mesh is performed relative to a region of the first candidate design that is not changeable by the generative design engine that generates the modified design.

13. A non-transitory computer readable medium storing instructions that, when executed by a processor, cause the processor to perform the steps of:

displaying one or more candidate designs within a virtual-reality (VR) environment;

receiving a user input indicating a modification of a mesh of a first candidate design included in the one or more candidate designs via the VR environment;

generating a modified design based on the modification of the mesh of the first candidate design;

generating, by a generative design engine, a plurality of output designs based on the modified design, wherein the generative design engine freezes weights associated with the generative design engine, identifies a vector in a latent space that represents a voxelated version of the user-modified design, and modifies the voxelated version of the modified design to generate each of the output designs; and displaying at least one output design included in the plurality of output designs within the VR environment.

14. The non-transitory computer readable medium of claim 13, wherein displaying the one or more candidate designs comprises positioning the one or more candidate designs within a first virtual display region of the VR environment.

15. The non-transitory computer readable medium of claim 14, wherein the first virtual display region includes a different virtual display volume for each of the one or more candidate designs.

16. The non-transitory computer readable medium of claim 14, wherein the first virtual display region includes at least one virtual display volume for the modified design.

17. The non-transitory computer readable medium of claim 14, wherein the steps further include displaying the modified design within a virtual display volume included in the first virtual display region.

18. The non-transitory computer readable medium of claim 14, wherein the at least one output design included in the plurality of output designs is displayed within a second virtual display region of the VR environment.

19. The non-transitory computer readable medium of claim 18, wherein the second virtual display region is adjacent to the first virtual display region.

20. The non-transitory computer readable medium of claim 18, wherein the first virtual display region and the second virtual display region are displayed within a radial graph, and the first virtual display region is positioned closer to a central portion of the radial graph than the second virtual display region is.

21. The non-transitory computer readable medium of claim 13, wherein the VR environment is configured as a radial graph in which virtual display volumes are progressively populated with candidate designs as the candidate designs are generated by succeeding iterations of the generative design engine.

22. A system, comprising:

a memory that stores instructions; and a processor that is communicatively coupled to the memory and is configured to, when executing the instructions, perform the steps of:

displaying one or more candidate designs within a virtual-reality (VR) environment;

receiving a user input indicating a modification of a mesh of a first candidate design included in the one or more candidate designs via the VR environment;

generating a modified design based on the modification of the mesh of the first candidate design;

generating, by a generative design engine, a plurality of output designs based on the modified design, wherein the generative design engine freezes weights associated with the generative design engine, identifies a vector in a latent space that represents a voxelated version of the user-modified design, and modifies the voxelated version of the modified design to generate each of the output designs; and displaying at least one output design included in the plurality of output designs within the VR environment.

* * * * *